United States Patent
Wils et al.

(10) Patent No.: US 6,687,751 B1
(45) Date of Patent: Feb. 3, 2004

(54) MULTI-POINT LINK AGGREGATION SPOOFING

(75) Inventors: Joris Johannes Maria Wils, Acton, MA (US); James Scott Hiscock, Rockport, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/493,563

(22) Filed: Jan. 28, 2000

(51) Int. Cl.[7] .......................................... G06F 15/173
(52) U.S. Cl. ...................... 709/230; 709/231; 709/232; 370/401; 370/484
(58) Field of Search ................................. 709/230, 231, 709/232; 370/401, 484

(56) References Cited

U.S. PATENT DOCUMENTS

| | | | |
|---|---|---|---|
| 6,058,116 A | * 5/2000 | Hiscock et al. | 370/401 |
| 6,163,543 A | * 12/2000 | Chin et al. | 370/400 |
| 6,310,894 B1 | * 10/2001 | Counterman | 370/484 |
| 6,385,197 B1 | * 5/2002 | Sugihara | 370/380 |
| 6,466,574 B1 | * 10/2002 | Fujisaki et al. | 370/356 |

* cited by examiner

Primary Examiner—Zarni Maung
Assistant Examiner—Jinsong Hu
(74) Attorney, Agent, or Firm—McGlew and Tuttle, P.C.

(57) ABSTRACT

A system with at least one, and preferably at least two, end devices that operates according to a point-to-point protocol such as the IEEE standard 802.3ad. The two end devices communicate with each other through a trunk cluster formed from a plurality of cluster devices. Each of the cluster devices has a synchronization means for configuring all of the cluster devices with a same logical identity to communicate with the end device according to the point-to-point protocol as if all of the cluster devices were a single device.

15 Claims, 4 Drawing Sheets

MULTI-POINT LINK AGGREGATION SPOOFING

FIELD OF THE INVENTION

The present venture relates to computer network communication, and in particular to combining a plurality of cluster devices to operate as a single device and increase bandwidth in a point-to-point protocol such as the Institute of Electrical and Electronics Engineers (IEEE) standard 802.3ad for multiple Ethernet links.

BACKGROUND OF THE INVENTION

The 802.3ad standard issued by the IEEE specifies how to use multiple Ethernet links to make a logical point-to-point connection. This standard is published by the IEEE and is available from their headquarters, 345 East 47$^{th}$ Street New York, N.Y. 10017. The IEEE is a well known organization to those skilled in the art of computer network communication. The standards of the IEEE are readily available and understandable to those skilled in the art of computer network communication. The IEEE standard 802.3ad is hereby incorporated by reference, as well as any portions of the entire 802 standard that may be relevant to 802.3ad. It is that those skilled in the art will be able to build a device that can adhere to the IEEE 802.3ad standard and meet the PICS performance in section 43B.6 of the standard. The present invention also relates to other point-to-point protocols and is not limited to the IEEE 802.3ad standard.

The IEEE 802.3ad standard assumes that the points of the connection are single devices and defines an optional Link Aggregation sublayer for use with CSMA/CD (carrier sense multiple access/collision detection) MACs (Media Access Control). Link Aggregation allows one or more links to be aggregated together to form a Link Aggregation Group, such that a MAC Client can treat the Link Aggregation Group as if it were a single link. To this end, it specifies the establishment of DTE to DTE logical links, which consist of N parallel instances of an 802.3 link all of which are full duplex point-to-point links operating at the same data rate.

U.S. Pat. No. 6,195,351 filed Jan. 28, 1998 discloses a Logical Switch Set (LSS) comprising two or more switches that act as a single packet forwarding device with specific connection rules. The single packet forwarding device is a single logical unit. The LSS may be used as either a redundant switch set (RSS) or as a Load Sharing Switch Set (LSSS). The maximum throughput of the LSSS increases with each additional switch. A LSSS can only interconnect with the other devices via trunked links that contain at least one physical connection to each switch. The RSS may include a trunk link connection and a resilient link connection. U.S. Pat. No. 6,195,351 is hereby incorporated by reference.

U.S. Pat. No. 6,195,349 filed Jan. 28, 1998 discloses a packet based high speed mesh forming a trunk cluster. The trunk cluster is constructed with a set of loosely coupled switches, a configuration protocol, trunked network interfaces, and optionally a reachablilty protocol. The trunk cluster provides a Logical LAN service. Each switch in the trunk cluster provides a single "shared LAN" by interconnecting two or more links. The edge devices attached to the links run a trunk configuration protocol. The attached edge devices view the trunked ports as if trunked ports are connected to a shared LAN with multiple other attached devices. U.S. Pat. No. 6,195,349 is hereby incorporated by reference.

U.S. Pat. No. 6,347,073 filed Apr. 29, 1998 discloses a plurality of independent control lines used by I/O modules to determine which switch of a redundant switch set is the active or primary switch. Each line is drive by a different source. Each of these control lines are driven by one of a plurality of judges and each judge can read the other control lines which they are not driving. All the I/O modules can only read the control lines. Each judge makes a decision as to which switch should be the primary switch. Each decision is conveyed using the control lines. The I/O modules use these control lines to direct a multiplexer of the respective outside node to connect to the primary switch. A majority rules algorithm is used to always obtain the correct result in the face of a single error. U.S. Pat. No. 6,347,073 filed Apr. 29, 1998 is hereby incorporated by reference U.S. Pat. 6,058,116 filed Apr. 15, 1998 discloses an arrangement of trunk clusters and a method for interconnecting trunk clusters wherein the interconnection method has no single point of failure, the bandwidth between trunk clusters is not limited by the throughput of a single switch, and faults are contained within each trunk cluster. A trunked interconnection structure is provided between trunk clusters. Each switch of a trunk cluster has a logical port connected to a trunked port. The trunked port or trunk port provides a physical connection to each trunk switch of another trunk cluster. Each trunk switch of the another trunk cluster has a logical port connected to a trunked port which in turn has physical connections to each switch of the first trunk cluster. Trunked interconnections isolate faults to a single trunk cluster, there is no single point of failure and the total throughput is not limited to any single switches capacity. This always provides a single loop free path from one trunk cluster to the other or others. Multiple trunk clusters may be interconnected using point-to-point connections. A high throughput campus interconnect trunk cluster can be used to connect each building data center trunk cluster. U.S. Pat. No. 6,058,116 filed Apr. 15, 1998 is hereby incorporated by reference.

SUMMARY AND OBJECTS OF THE INVENTION

It is a primary object of the present invention to provide a plurality of network devices as representing a single point device of the point-to-point protocol, such as the IEEE 802.3ad standard. The present invention makes it possible to have one or both of the points of the IEEE 802.3ad standard be multiple devices. The multiple devices of the present invention are configured to behave as a single point in such a way that the multiple devices still adhere to the 802.3ad standard. Thus the multi device point can be seamlessly connected to a conventional single device that supports the 802.3ad specification.

The present invention accomplishes this by providing a system with at least one, and preferably at least two, end devices that operate according to the point-to-point protocol. The two end devices communicate with each other through a trunk cluster formed from a plurality of cluster devices. More than one of the cluster devices are in communication with more than one of the end stations, and the cluster devices identify connected end stations. The cluster devices share the identity of the connected end stations and commonly connected end stations. Each of the cluster devices has a synchronization means for configuring each the cluster device in communication with the commonly connected end stations to use a same logical identity for the point-to-point protocol.

The synchronization means of each cluster device exchanges individual synchronization state data with the synchronization means of the other cluster devices. Each synchronization means then configures the respective cluster device dependent on the exchanged synchronization state data and its own synchronization state data. If there are only two substantially similar cluster devices, both synchronization means can use the same algorithms to determine respective configurations. Since both synchronization means will apply the algorithms to the same data, the configurations will be identical and compatible.

For a trunk cluster with a large number of cluster devices, and/or significantly different cluster devices, each of the synchronization means can include algorithms and communicate with each other to operate one of the synchronization means as a master synchronization means (MSM). The master synchronization means determines cluster synchronization data needed for configuring and operating the individual cluster devices in order for the individual cluster devices to communicate with the end device according to the IEEE standard 802.3ad. The master synchronization means transfers the cluster synchronization data to the plurality of cluster devices in the trunk cluster. Each synchronization means configures a respective cluster device according to the cluster synchronization data.

The master synchronization means can be chosen based on the synchronization state data of the individual cluster devices, or the election of the master synchronization means can be predetermined, such as by a system operator. Likewise the cluster synchronization data can be determined from the individual synchronization data of the cluster devices, or the cluster synchronization data can be predetermined, such as by a system operator.

The cluster devices communicate with the end devices through communication links. The communication of the individual synchronization data and the cluster synchronization data is performed through an intra-cluster interconnect (ICI.). The intra-cluster interconnect can be formed from dedicated network links between the cluster devices, or the intra-cluster interconnect can be included in the communication carried by the communication links. In either embodiment, each device in the trunk cluster has a unique identification for the intra-cluster interconnect communication. The communication across the intra-cluster interconnect is based on the unique identification of the individual cluster devices. The design of the intra-cluster interconnect is well within the ability of those skilled in the art of computer network communication, and the exact design of the intra-cluster interconnect is not part of the scope of the present invention.

In a preferred embodiment, each of the cluster devices has means for operating according to be IEEE standard 802.3ad, and this means is configurable by the synchronization means of the present invention. The present invention is not limited to two single end devices communicating through a trunk cluster, but instead a plurality of trunk clusters could communicate with each other according to the 802.3ad standard, where each trunk cluster appears as a single point device according to the 802.3ad standard.

The present invention is an improvement over the 802.3ad standard, since additional bandwidth can be added to an end device by taking advantage of additional network devices. In the 802.3ad standard, additional bandwidth can only be added by adding additional communication links that directly connected two devices. If one of the devices has less ports than the other, bandwidth of the device having more ports is wasted with the IEEE standard 802.3ad. With the present invention a plurality of cluster devices having a small number of ports can be connected to a single 802.3ad device to take full advantage of all the ports of the single 802.3ad device. The present invention provides efficient configuration of a computer network which will increase the rate at which a computer network can transfer data, and/or reduce the equipment needed to insure an adequate data rate. The plurality of network devices representing a single 802.3ad device also increases reliability of a network by eliminating a single point of failure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
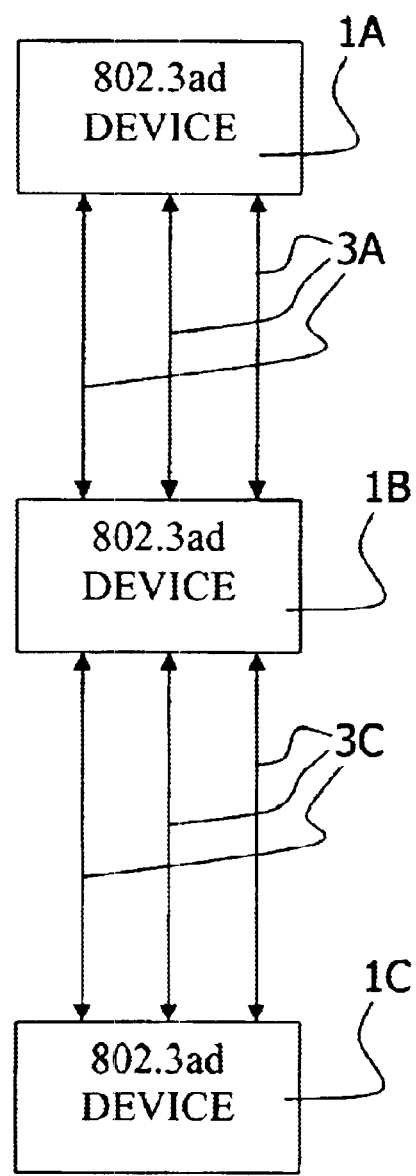
FIG. 1 is a schematic diagram of computer network devices operating according to the 802.3ad standard.
Figure 2:
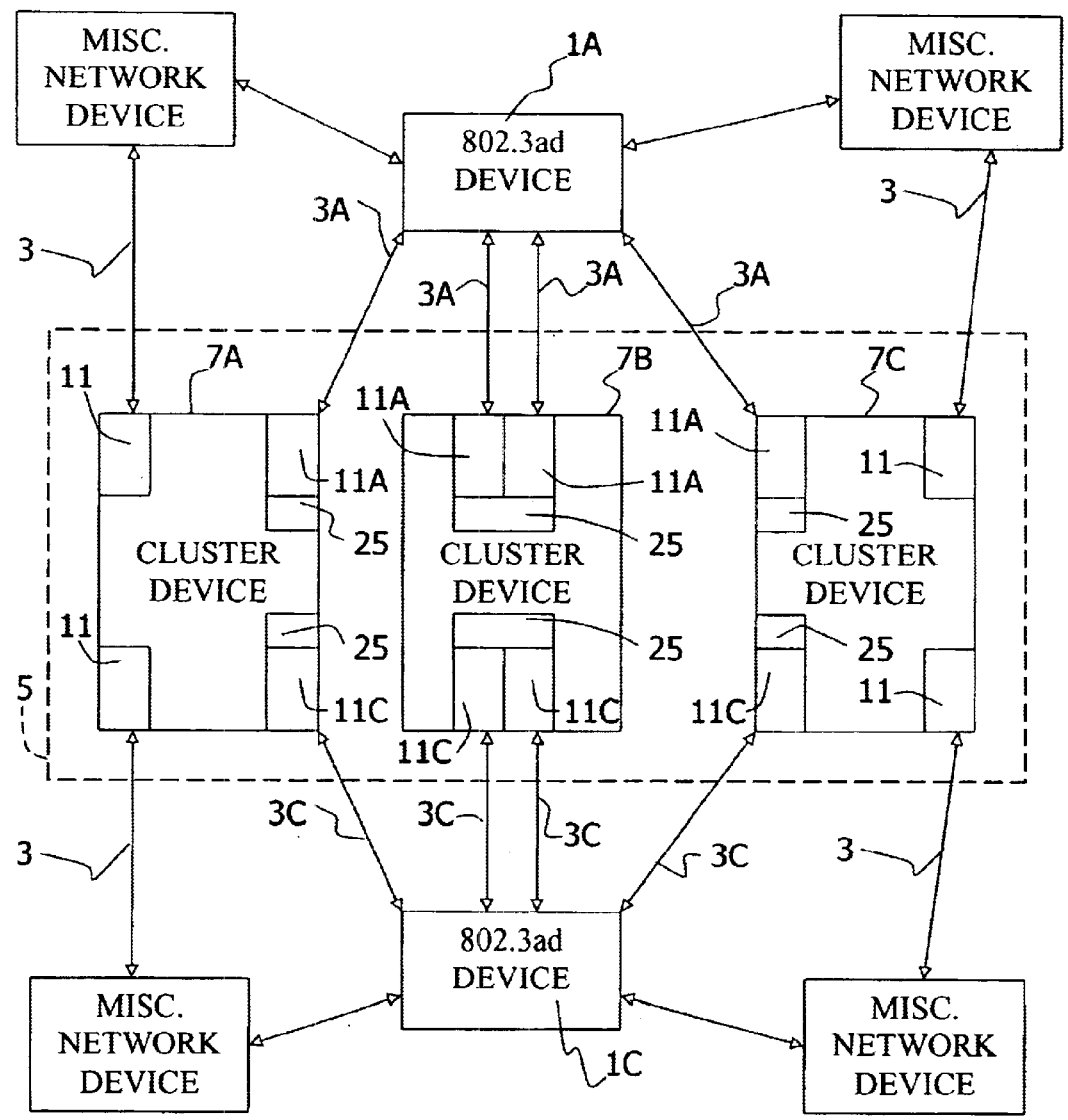
FIG. 2 is a schematic diagram of a trunk cluster communicating with end devices according to the 802.3ad standard.

Referring to the drawings, and in particular to FIG. 1, the 802.3ad standard applies to a computer network where a single 802.3ad device 1A communicates with another 802.3ad device 1B through a plurality of communication links 3A. The standard allows the communication between devices 1 to use more than one communication link 3, and thus increases the bandwidth and the data rate between two of the devices 1. However the 802.3ad standard is not designed to have one network device 1A communicate with another network device 1C through a plurality of communication links 3 connected to a plurality of in between devices 7 as shown in FIG. 2. The 802.3ad standard is therefore unable to take advantage of multi-home connections and any unused capacity that might be available on other devices that have similar connections. Each single 802.3ad device inherently becomes a single point of failure.

FIG. 2 shows two 802.3ad devices 1A, 1C which in the embodiment of FIG. 2 can be considered end devices 1A, 1C. The end devices 1A, 1C communicate through communication links 3A, 3C and through a trunk cluster 5 which has been configured to appear to the end devices 1A, 1C as a single 802.3ad device such as 802.3ad device 1B in FIG. 1. Inside the trunk cluster 5 are a plurality of cluster devices 7. Each cluster device 7 is connected to each of the end devices 1A, 1C by one of the communication links 3A, 3C. It is also possible for the cluster devices 7 to also communicate with other miscellaneous network devices 9. The end devices 1 can also communicate with the other miscellaneous network devices 9. The miscellaneous network devices are shown to indicate that the present invention can be incorporated into a larger computer network and that the present invention is not required to form the entire computer network.

Each cluster device 7 includes a plurality of ports 11. The ports 11 are connected to the other network devices by the communication links 3. Cluster device 7B is shown connecting to the end devices 1A, 1C by a plurality of ports 11A and 11C in accordance with the 802.3ad standard. The two ports 11A in cluster device 7B form a logical or virtual port. Each port 11 in a logical port is connected to a link aggregation sublayer 25. The present invention combines ports 11A in cluster devices 7A and 7C also into the logical port of cluster device 7B, and these ports have link aggregation sublayers 25. The same combining of ports 11C into a logical port with a link aggregation sublayer 25 is also shown in FIG. 2.

Figure 3:
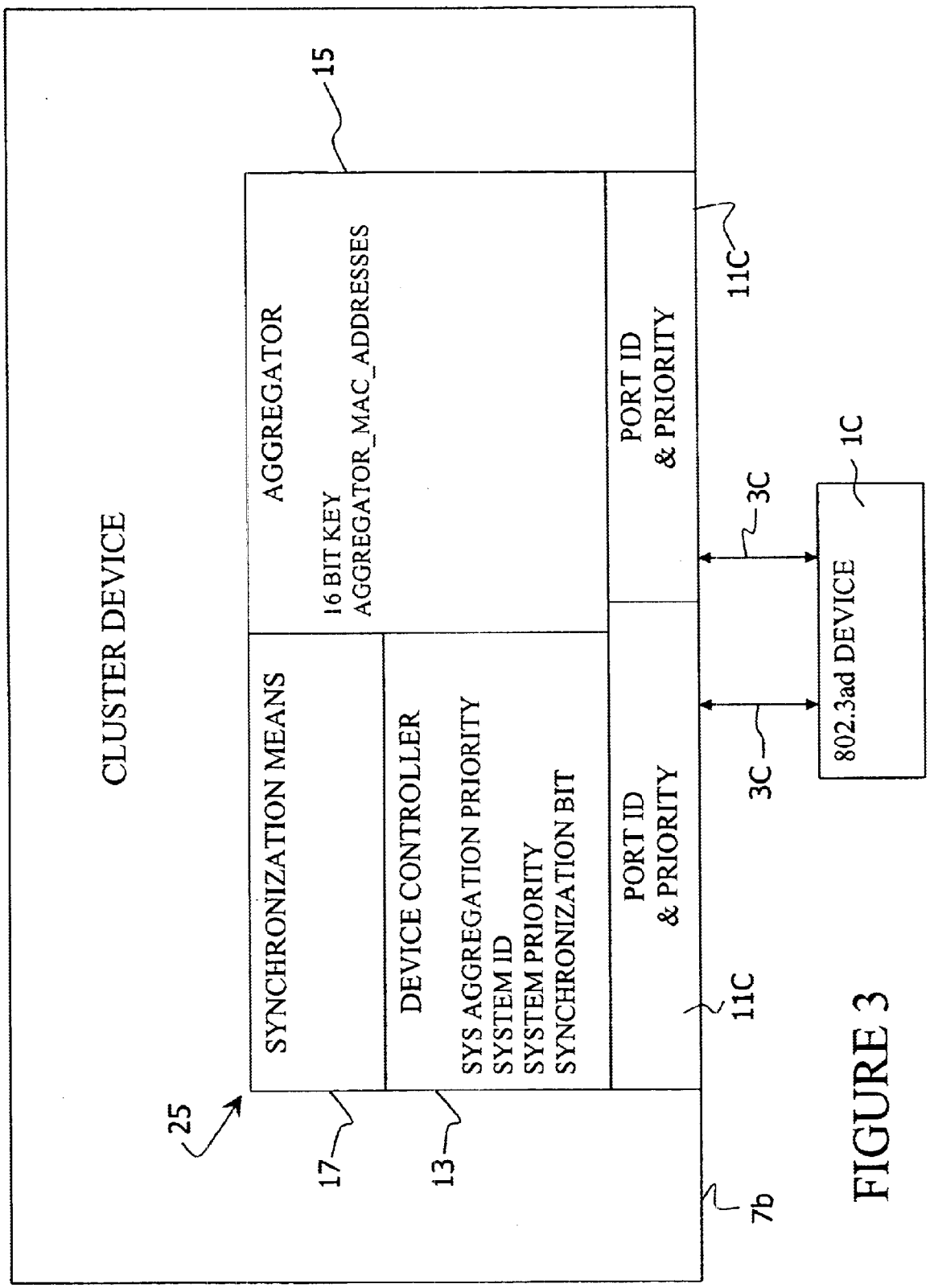
FIG. 3 is an enlarged schematic diagram of a link aggregation sublayer for configuring the cluster devices to operate according to the 802.3ad standard.

FIG. 3 is an expansion of the lower bottom portion of FIG. 2. Each port 11 has a port ID and a port priority. Each aggregation sublayer 25 includes a device controller 13 which controls how the cluster device 7 operates. The device controller 13 preferably is an 802.3ad means for operating the cluster device according to 802.3ad standard. Each aggregation sublayer 25 also includes an aggregator 15 in accordance with the 802.3ad standard. Aggregators 15 can be assigned a 16 bit key. Those aggregators 15 that have the same key on each cluster device 7 are considered to be a component of a trunk cluster wide cluster aggregator. The aggregators 15 will appear to the end device 1 as a single aggregator.

FIG. 3 also shows that each cluster device 7 also includes synchronization means 17. The synchronization means 17 configures the respective link aggregation sublayer 25 and in particular the respective device controller 13, to cause all of the cluster devices 7 to appear to the end device 1 as a single 802.3ad device. The synchronization means 17 of each of the cluster devices 7 provides what is known in the art, as a plurality of cluster devices 7 "spoofing" a single 802.3ad device.

Figure 4:
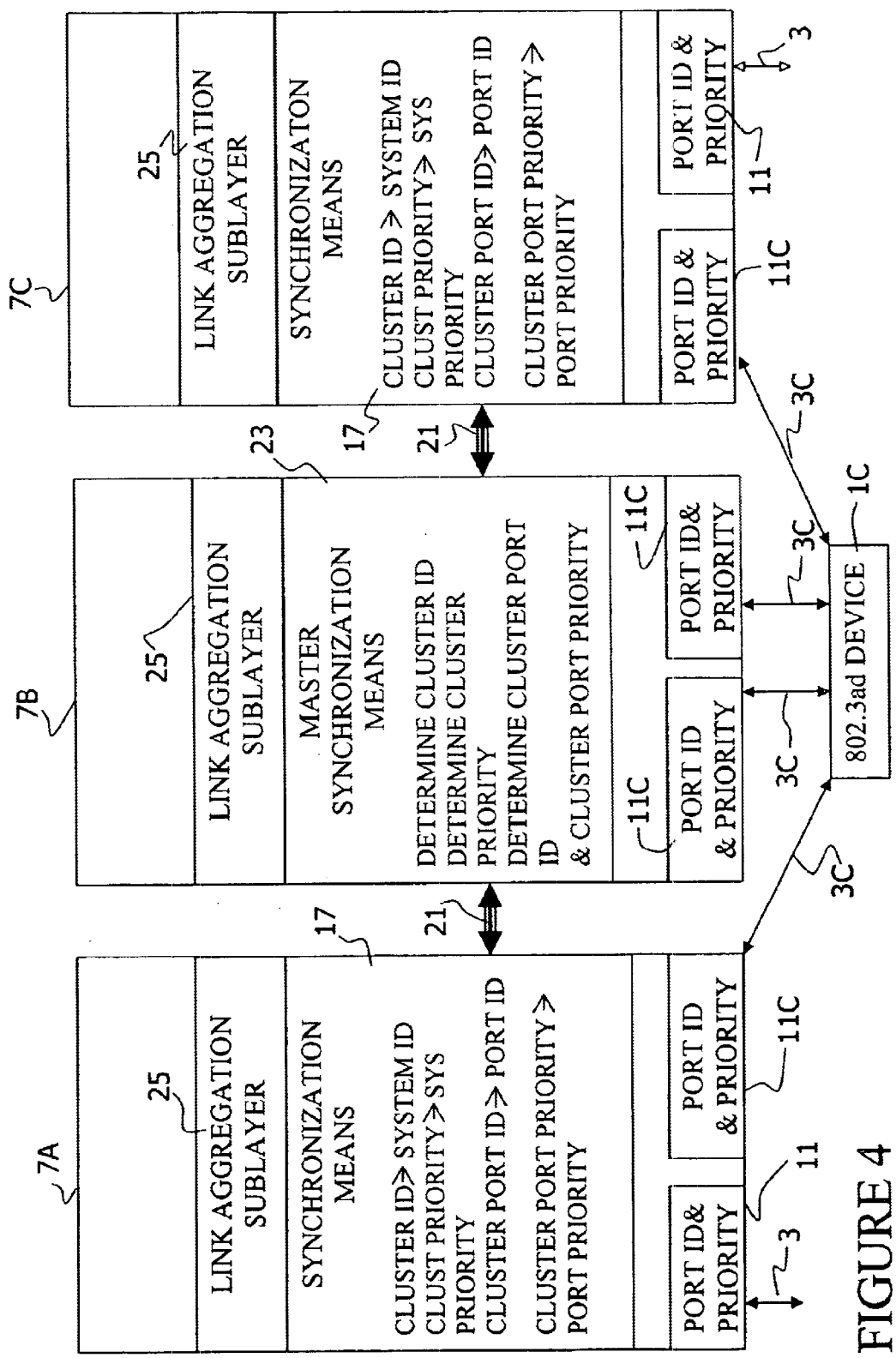
FIG. 4 is a schematic diagram of the interaction between the synchronization means of the different cluster devices.

As shown in FIG. 4, the synchronization means 17 of each link aggregation sublayer 25 in each cluster device 7 exchange individual synchronization data and cluster synchronization data over or through an intra-cluster interconnect. The intra-cluster interconnect can either be formed of dedicated network links 21 or the intra-cluster interconnect can be included in the communication passing through communication links 3C.

Each synchronization means 17 communicates with the synchronization means 17 in the other cluster devices 7 through the ICI 21. Each synchronization means 17 also can communicate and control the functions in its respective cluster device 7 that are required to meet the 802.3ad specification.

Each device in the cluster has an associated 8 octet binary number called the system aggregation priority as specified in section 43.6.1 of the 802.3ad specification. Through the ICI, the synchronization means 17 in the cluster device 7 will determine which cluster device 7 has the lowest numerical value for the system aggregation priority. The cluster device 7 with the lowest numerical value has the highest priority and is preferably chosen as the Master Synchronization Means (MSM) 23.

The Master Synchronization Means (MSM) 23 does the following:
1. Chooses a cluster Identification. This Id, which is 6 bytes long, has the same format and meets the same specifications as the system Id for individual devices. To do so, the MSM may collect the system Identifiers of the active cluster devices 7 over the ICI and by choosing among one of them. The MSM may also read the value from a database configured by a user or system operator.
2. Chooses a cluster priority. This value, which is 2 bytes long, has the same format and meets the same specifications as the system priority for individual devices. To do so it may collect the system priorities of the active devices in the cluster over the ICI and choose among one of them. It may also read the value from a database configured by a user.
3. Communicates the chosen cluster Identification value and cluster priority to the synchronization means 17 in other devices.
4. Chooses the cluster_aggregator-MAC-Address for each cluster aggregator. To do so the MSM may collect the aggregator-MAC-Addresses of the aggregators 15 that make up the cluster aggregator and choose a value amongst them. It may also read the mac addresses from a database configured by a user.
5. Chooses the port ID's that each device 7 in the cluster is to use for its ports 11. These port ID's which are 2 bytes long have the same format and meet the same specifications as the Port Id for individual devices 1, 7. To do so it may collect the Port ID's of the active devices 7 in the trunk cluster 5 over the ICI. It may also read the values from a database configured by a user.
6. Chooses the port priority to be used for each port 11 on each device 7 in the trunk cluster 5. These port priorities which are 1 byte long have the same format and meet the same specifications as the Port priority for individual devices 1, 7. To do so the master synchronization means 23 may collect the Port priorities of the active devices 7 in the trunk cluster 5 over the ICI . The master synchronization means 23 may also read the values from a database configured by a user.
7. Communicates the chosen port ID's and port priorities for each port 11 on each device to the synchronization means 17 in other devices 7 in the trunk cluster 5.
8. Receives lists of actor keys, partner keys, partner system ID's and constraint details from the synchronization means 17 in other devices 7. After having received a list from each active synchronization means 17, the master synchronization means 23 selects:
   a. which ports 11 are to go into the STANDBY state
   b. which ports 11 should change their key values and what key value it should be changed to.
9. Communicate the decisions from the above operation 8 to the synchronization means 17 of the other devices.
10. Communicates to the synchronization means 17 of the other cluster devices 7 when the other cluster devices 7 are allowed to change the synchronization bit in the Link Aggregation Control Protocol Data Unit (LACPDU) to In—Sync. The master synchronization means 23 will send this command, when it has had sufficient communication with each synchronization means 17 or has decided that a synchronization means 17 is not available or functioning.

Each synchronization means 17 does the following:
1. Periodically sends messages over the ICI containing its system aggregation priority to indicate that it is healthy. Tracks the functioning of all the synchronization means 17 by tracking these messages. If the master synchronization means 23 is not heard, select the synchronization means 17 with the lowest value for the system aggregation priority to be the new master synchronization means 23.
2. May collect one or more of the following: the system Id, system priority, Port ID's, Port priority and aggregator-MAC-Addresses and communicate them to the master synchronization means 23.
3. Commands the functions that set the synchronization Bit in the LACPDU to keep it low until the highest priority synchronization means 17 communicates to the synchronization means 17 that the bit is allowed to go high. This effectively means that the Mux State on the device stays in the Out—of Sync state.

4. Commands the functions that use the system Identifier to meet the 802.3ad standard to use the cluster Identifier. This includes functions that construct the Marker PDUS, Marker Response PDUs and LACPDU in its device and functions that look for loopbacks.

5. Commands the functions that use the system priority to meet the 802.3ad standard to use the cluster priority. This includes functions that construct the Marker PDUS, Marker Response PDUs and LACPDU in its device.

6. Commands the functions that use the aggregator-MAC_Address to meet the 802.3ad standard to use the cluster_aggregator-MAC-Address for each aggregator 15 that is a member of a trunk cluster 5. The aggregator 15 must communicate to the MAC Client the cluster_aggregator_MAC-Address.

7. Commands the functions that use the Port ID's and Port priorities to meet the 802.3ad standard to use the Port ID's and Port priorities allocated by the master synchronization means 23 to its device instead.

8. Commands the functions that may exist in the cluster device 7 to handle limited aggregation capability as described in 43.6.2 to:
   a. not change any port's operational key values unless so commanded by the highest priority synchronization means 23;
   b. to sends its device's synchronization means 17 the port ID's, partner keys and partner system ID's of those ports 11 that can't all aggregate due to an aggregation constraint;
   c. to keep the ports 11 that can't all aggregate in the Out-of-sync state until the synchronization means 17 indicates which ports 11 are to become SELECTED and which STANDBY.

9. Communicates the constraint details, actor keys, partner keys, partner system ID's and port ID's of those ports 11 that can't fully aggregate due to constraints to the master synchronization means 23.

10. When the master synchronization means 23 indicates which ports of a constrained aggregation should change their key values and which should go into STANDBY communicate to the constraint function to:
    a. change the operational key values of the ports 11 to the values indicated by the master synchronization means 23;
    b. set the ports 11 that are not to go into the STANDBY state into the In_Sync state.

In some cases it is desirable that there are aggregation constraints that apply to the whole trunk cluster 5. If the devices 7 in the trunk cluster 5 are bridges for example, there are conditions under which it may be necessary for all the communication links 3 to one or more devices to not be used. The master synchronization means 23 can be aware of these rules and can decide which ports 11 on which cluster devices 7 are not to be used. It can send a command to the synchronization means 17 of the other devices to indicate that the not-to-be used ports 11 are to go into the STANDBY state.

The synchronization means 17 in the devices will command the functions that control the port state to go into the Out-of-Sync state and to indicate this by setting the synchronization bit to 0.

If there are only two cluster devices 7, it may be easier to not choose a master synchronization means 23. A reliable communication can be set up much like the one designed for the 802.3ad specification, whereby each synchronization means 17 knows the state of the other synchronization means 17. Each synchronization means 17 will send to the other synchronization means 17, what it would have sent to the master synchronization means 23, plus some additional maintenance information. It is then possible for each synchronization means 17 to deduce on its own what the master synchronization means 23 would have deduced. Then each synchronization means 17 can configure the functions in its respective cluster device 7 as it would have if a master synchronization to and means 17 was chosen.

While specific embodiments of the invention have been shown and described in detail to illustrate the application of the principles of the invention, it will be understood that the invention may be embodied otherwise without departing from such principles.

What is claimed is:

1. An aggregate link system, comprising:
   a plurality of end stations operating using a point-to-point protocol;
   a plurality of cluster devices forming a cluster, more than one of said cluster devices being in communication with more than one of said end stations, said cluster devices identifying connected said end stations;
   an intra-cluster interconnect (ICI) providing communication between said cluster devices, said cluster devices share said identity of said connected end stations and commonly connected said end stations;
   synchronization means (SM) in each of said cluster devices for configuring each said cluster device in communication with said commonly connected end stations to use a same logical identity for said point-to-point protocol.

2. The system in accordance with claim 1, wherein:
   said point-to-point protocol is IEEE standard 802.3ad;
   said end devices are 802.3ad devices operating according to IEEE standard 802.3ad;
   said synchronization means (SM) in each of said cluster devices configures each said cluster device to communicate with said 802.3ad devices according to the IEEE standard 802.3ad.

3. The system in accordance with claim 2, wherein:
   one of said synchronization means is a master synchronization means (MSM) and determines cluster sync data for operating said cluster devices to communicate with said 802.3ad device according to the IEEE standard 802.3ad;
   said MSM transfers said cluster sync data to said plurality of cluster devices through said ICI;
   each said SM configures a respective cluster device according to said cluster sync data.

4. The system in accordance with claim 2, wherein:
   each said cluster device includes 802.3ad means for individually operating a respective said cluster device according to the IEEE standard 802.3ad, said 802.3ad means being configurable by a respective said SM.

5. The system in accordance with claim 3, wherein:
   said cluster devices exchange individual sync data with other said cluster devices and said synchronization means choose said MSM based on said individual sync data.

6. The system in accordance with claim 5, wherein:
   said MSM determines said cluster sync data based on said individual sync data.

7. The system in accordance with claim 1, wherein:

each said synchronization means in each of said cluster devices communicates with said synchronization means in other of said cluster devices through said ICI.

8. The system in accordance with claim 7, wherein:

said communication between said end stations and said cluster devices is through communication links, said ICI provides said communication between said cluster devices through said communication links.

9. The system in accordance with claim 1, wherein:

one of said synchronization means exchanges individual sync data with another of said synchronization means, and both of said synchronization means configure said respective cluster device dependent on respective said sync data and said sync data from said other synchronization means.

10. The system in accordance with claim 1, wherein:

said ICI includes dedicated network links between said cluster devices.

11. The system in accordance with claim 10, wherein:

said ICI provides said communication between said cluster devices through third party devices.

12. The system in accordance with claim 1, wherein:

said end stations are single point devices.

13. The system in accordance with claim 1, wherein:

said end stations are multi-point devices.

14. An aggregate link system, comprising:

a cluster of cooperating cluster member devices;

an end device;

trunk links connecting each end device to each device in said cluster;

a coordinating link between said devices in said cluster of cooperating devices, said coordinating link being defined either by said end device and said trunk links or an intra cluster interconnect;

each of said cooperating cluster member devices having a synchronization means for establishing a logical point to point connection across multiple Ethernet links, one of said synchronization means being a master synchronization means provided at one of said cooperating cluster member devices such that the multi-point communication of the cluster behaves as a single point device.

15. An aggregate link system, comprising:

a cluster of cooperating cluster member devices;

an end device;

trunk links connecting each end device to each device in said cluster;

a coordinating link between said devices in said cluster of cooperating devices, said coordinating link being defined either by said end device and said trunk links or an intra cluster interconnect;

each of said cooperating cluster member devices having a synchronization means for establishing a logical point to point connection across multiple Ethernet links and coordinating such that the multi-point communication of the cluster behaves as a single point device.

* * * * *